(12) United States Patent
McGarvey

(10) Patent No.: US 6,751,382 B2
(45) Date of Patent: Jun. 15, 2004

(54) SYSTEM FOR ORGANIZING WIRES AND CABLES

(75) Inventor: Bruce E. McGarvey, Sioux City, IA (US)

(73) Assignee: Gateway, Inc., Poway, CA (US)

( * ) Notice: Subject to any disclaimer, the term of this patent is extended or adjusted under 35 U.S.C. 154(b) by 407 days.

(21) Appl. No.: 09/753,352

(22) Filed: Dec. 29, 2000

(65) Prior Publication Data

US 2002/0085828 A1 Jul. 4, 2002

(51) Int. Cl.[7] .................. G02B 6/44; H01B 17/16; H01B 17/58; F16B 7/00
(52) U.S. Cl. .................. 385/102; 385/103; 385/104; 385/147; 174/168; 403/186; 403/331
(58) Field of Search .................. 385/100–114, 147; 160/403; 332/36; 292/332–336; 174/168

(56) References Cited

U.S. PATENT DOCUMENTS

| | | | |
|---|---|---|---|
| 1,703,712 A | * 2/1929 | Aud | 383/64 |
| 2,810,944 A | * 10/1957 | Sander | 24/400 |
| D257,321 S | 10/1980 | Voorhees, Jr. | |
| 4,356,599 A | 11/1982 | Larson et al. | |
| 4,447,032 A | 5/1984 | Olsen | |
| 4,721,268 A | 1/1988 | Lerner et al. | |
| 4,900,126 A | * 2/1990 | Jackson et al. | 385/114 |
| 4,968,171 A | * 11/1990 | Shell | 403/4 |
| D347,782 S | 6/1994 | Wentzel | |
| 5,320,312 A | 6/1994 | Hoenninger | |
| 5,402,971 A | 4/1995 | Bower | |
| 5,553,600 A | 9/1996 | Miller | |
| 5,617,496 A | * 4/1997 | Kingstone | 385/100 |
| 5,639,049 A | 6/1997 | Jennings et al. | |
| 5,676,566 A | 10/1997 | Carlson, Jr. et al. | |
| D387,652 S | 12/1997 | Carlson, Jr. | |
| 5,709,249 A | 1/1998 | Okada et al. | |
| 5,720,632 A | 2/1998 | Viklund | |
| 5,778,656 A | 7/1998 | Hart | |
| 5,836,148 A | 11/1998 | Fukao | |
| 5,921,402 A | 7/1999 | Magenheimer | |
| 5,949,027 A | 9/1999 | Ciesko et al. | |
| 5,964,611 A | 10/1999 | Jacob et al. | |
| 6,012,683 A | 1/2000 | Howell | |
| 6,025,558 A | 2/2000 | Doye et al. | |
| 6,049,040 A | 4/2000 | Biles et al. | |
| 6,061,884 A | 5/2000 | Ohms et al. | |
| 6,067,233 A | 5/2000 | English et al. | |
| 6,068,506 A | 5/2000 | Shen | |
| 6,107,575 A | 8/2000 | Miranda | |
| 6,234,707 B1 | * 5/2001 | Maier-Hunke | 403/331 |

OTHER PUBLICATIONS

Electrical Sleeving, p. 1174, 1178, 1186, 1188, 1203, *Newark Electronic Components Catalogue* 1998 edition.
http://www.smarthome.com/images dated Aug. 18, 2000.

* cited by examiner

*Primary Examiner*—Akm Enayet Ullah
*Assistant Examiner*—Jerry T Rahll
(74) *Attorney, Agent, or Firm*—Scott Charles Richardson; Jeffrey A. Proehl; Kaardal & Leonard

(57) ABSTRACT

A system for organizing elongated objects (such as wires, cables, pipes, hoses, ducts, tubing, and other similar items) into bundles to create a more uniform, neat and functional arrangement is disclosed. The system includes a fastener adapted to extend along the length of an elongated object. The fastener provides a continuous attachment to another elongated object or to another object for a distance along the length of the elongated object. The fastener is preferably integrated with the structure of the elongated object, or alternatively, it may be applied as a wrap around the elongated object.

29 Claims, 6 Drawing Sheets

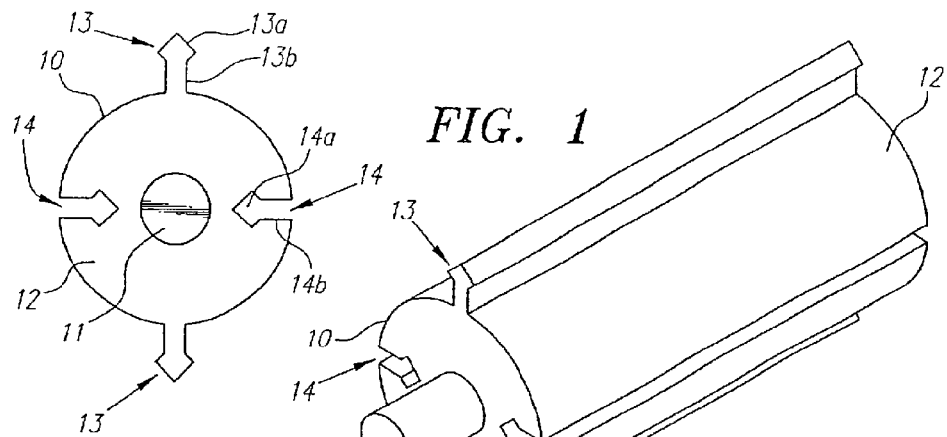
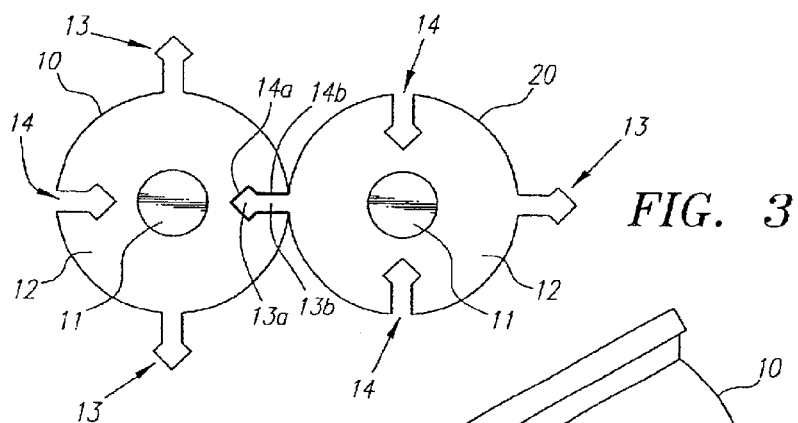
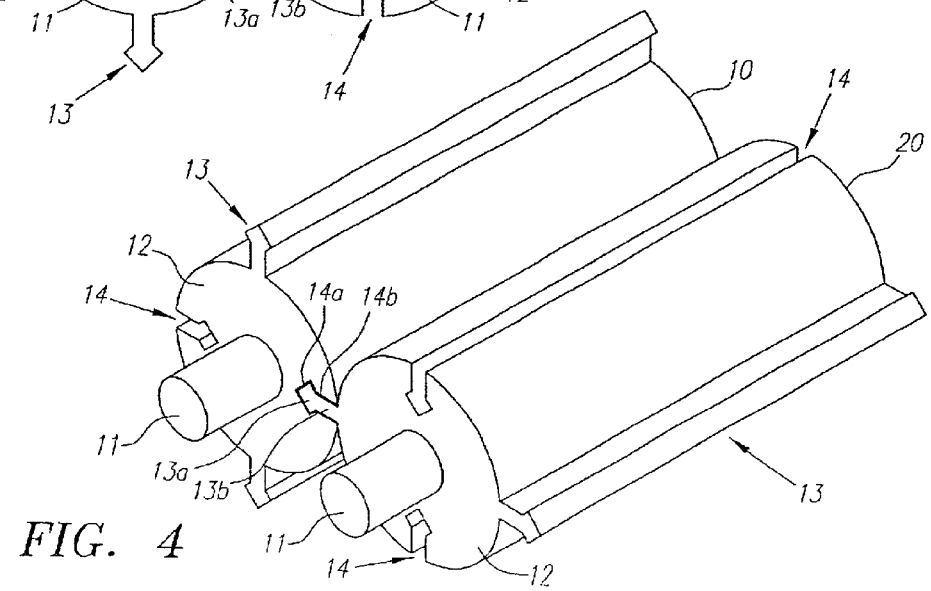
FIG. 1
FIG. 2
FIG. 3
FIG. 4

SYSTEM FOR ORGANIZING WIRES AND CABLES

FIELD OF THE INVENTION

The present invention relates to a system for organizing wires, cables, pipes, hoses, ducts, tubing, and other similar items, and more particularly, to a system for organizing such items with a fastener adapted to extend along the length of at least one of the objects to be organized.

BACKGROUND OF THE INVENTION

Wires and cables used in homes and offices are often a tangled mess, especially behind computers and in the ceilings of businesses. Plastic ties are typically used at intervals to "pigtail" a group of wires and cables together, but the combination of many wires and cables remains a challenge to keep organized. The multiplicity of wires and cables behind the everyday personal computer looks messy and detracts from the computer's appealing look, canceling out the effort put into visual design.

Cable ties have long been used to bundle various cables together, such as electrical cables, wires, pneumatic hoses, pipes, tubes, etc. These ties generally have an elongated flexible strap with a pointed or rounded tip at one end and a locking mechanism at the other end. Each tie is wrapped around the bundle of cables and the tip is locked into the locking mechanism, thus containing the cable bundle. Consumers and office workers have also frequently resorted to ad hoc mechanisms, such as wires, garbage bag twist ties, string and rubber bands, to bundle cables together.

There are several drawbacks to bundling cables with such cable ties or similar ad hoc mechanisms. First, the cable ties are typically not reusable, so if a cable needs to be removed from the bundle, the tie has to be broken and a new tie used to re-form the bundle. Second, the cable tie is an extra piece of equipment that must be used, which increases costs. Third, the cable ties must be stored somewhere and retrieved when needed, which increases the time required to do the bundling. Finally, cables can loosen or stray from the bundle, because the cable ties do not provide a continuous attachment for a distance along the length of the cables.

Trays have also been used to bundle various cables together. These trays typically have a rigid elongated structure with a U-shaped cross-section, which is designed to hold several cables. The trays may be placed on the floor or along a wall. However, these trays are extra pieces of equipment, which add to the cost of the system. They can also be difficult to use in areas where space is at a premium, or where it is necessary to flex the cables around a variety of obstructions, or where the cables are being run through conduits or drop ceilings. Furthermore, extra time must be spent to design the tray system, acquire the necessary equipment, and implement the tray system. Moreover, these trays do not fasten the cables to each other, so cables can become tangled, loosened, or can stray from the tray.

SUMMARY OF THE INVENTION

Embodiments of the present invention relate to a system for organizing elongated objects, such as wires, cables (such as computer, electrical, power, fiber optics, telephone, network, and/or other cables), pipes, hoses, ducts, tubing and other similar items, into bundles using a fastener, to create a more uniform, neat, and functional arrangement.

In one aspect of a preferred embodiment, a fastener is adapted to extend for a distance along the length of an elongated object. The fastener is preferably integrated with the structure of the elongated object. The fastener also provides a reusable attachment to another elongated object or another object.

In another aspect of a preferred embodiment, the fastener is adapted to be wrapped around the elongated object for a distance along the length of the elongated object.

BRIEF DESCRIPTION OF THE DRAWINGS

FIG. 1 is an end view of a preferred embodiment of a cable with fasteners, using at least one raised bead and at least one indented channel.

FIG. 2 is a perspective view of the cable with fasteners illustrated in FIG. 1.

FIG. 3 is an end view of a pair of cables attached to each other with fasteners, using at least one raised bead and at least one indented channel, in accordance with a preferred embodiment of the present invention.

FIG. 4 is a perspective view of the pair of cables attached to each other with fasteners illustrated in FIG. 3.

DETAILED DESCRIPTION OF THE PREFERRED EMBODIMENTS

Figure 5:
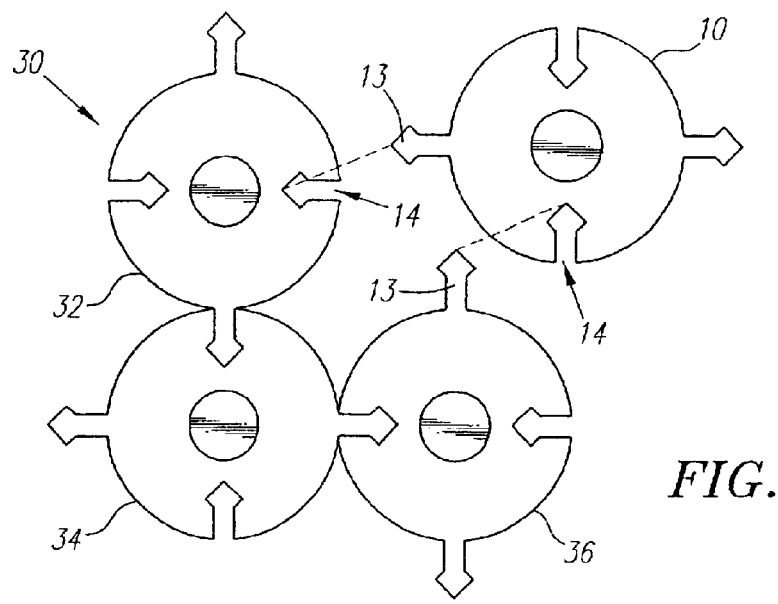
FIG. 5 is an end view of a bundle of cables attached to each other with fasteners, using at least one raised bead and at least one indented channel, in accordance with a preferred embodiment of the present invention.

In accordance with preferred embodiments of the present invention, a system is provided for organizing elongated objects, such as wires and cables, with a fastener adapted to extend along the length of at least one of the elongated objects. As used herein, the phrase "elongated object" refers to any object with a length exceeding its width, including but not limited to, wires, cables (such as computer, electrical, power, fiber optics, telephone, network, and/or other cables), pipes, hoses, ducts, tubing, and/or other similar items.

FIGS. 1–2 show an exemplary elongated object, a cable 10, in accordance with a preferred embodiment of the present invention. In the illustrated embodiment, the cable 10 includes an electrically conducting element 11 surrounded by an insulating material 12. The insulating material 12 is preferably a flexible material, but a rigid material may be used. The composition of the insulating material 12 is a design choice that depends on the application of the elongated object and is not critical to the invention. For example, the insulating material 12 may be a flexible plastic, a rigid plastic, a metal, or the like. In alternative embodiments, the electrically conducting element 11 may be omitted from the elongated object 10, and instead, the elongated object 10 may have, for example, a channel for transporting liquids or gases surrounded by an insulating material 12 compatible with the liquid or gas being transported.

In preferred embodiments, the cable 10 also includes one or more fasteners 13 and 14 extending along the length of the cable 10. The fasteners 13 and 14 provide a continuous attachment between the cable 10 and either another elongated object or another object, the attachment extending along all or substantially all of the length of the cable 10. The fasteners 13 and 14 may be removed from and re-attached to the other elongated object or other object, and thus, are reusable.

In the embodiment shown in FIGS. 1–2, the fasteners 13 and 14 include a pair of raised beads 13 and a pair of indented channels 14 which are incorporated into the structure of the cable 10, preferably being formed as an integral part of the insulating material 12. In this embodiment, the raised beads 13 and the indented channels 14 are molded into the insulating material 12 of the cable 10.

The raised beads 13 are preferably constructed in such a manner as to fit within corresponding indented channels 14 on other elongated objects or other objects. Likewise, the indented channels 14 are preferably constructed in such a manner as to fit around corresponding raised beads 13 on other elongated objects or other objects. The raised beads 13 and indented channels 14 are further preferably constructed such that the application of force is required to fit the raised beads 13 within the indented channels 14 and to detach the raised beads 13 from the indented channels 14.

In the illustrated embodiment, one of the raised beads 13 is molded into the top of the insulating material 12, and the other raised bead 13 is molded into the bottom of the insulating material 12. Additionally, one of the indented channels 14 is molded into the left side of the insulating material 12, and the other indented channel 14 is molded into the right side of the insulating material 12. However, other positions may be chosen for the raised beads 13 and the indented channels 14. As shown in FIG. 2, the raised beads 13 and the indented channels 14 extend lengthwise along the insulating material 12.

The precise number and location of raised beads 13 and indented channels 14 on a cable 10 are not critical to the invention. The configurations of raised beads 13 and indented channels 14 are selected to produce a desired configuration of connected cables 10, as described in detail below. While the raised beads 13 and the indented channels 14 are preferably located symmetrically around the cable 10, the raised beads 13 and the indented channels 14 may also be located asymmetrically around the cable 10.

The raised beads 13 and the indented channels 14 may take a number of shapes. Referring to the embodiment illustrated in FIGS. 1–2, the raised bead 13 includes a tip 13a that is wider than a stem 13b of the raised bead 13. Correspondingly, the indented channel 14 includes a neck 14b that is narrower than a chamber 14a. When the tip 13a of the raised bead 13 is inserted into the indented channel 14, the tip 13a fits within the chamber 14a and the stem 13b fits along the neck 14b. The tip 13a, being wider than the neck 14b, holds the raised bead 13 within the indented channel 14. In the illustrated embodiment, the tip 13a and the chamber 14a have square cross-sections. However, other shaped cross-sections may be used. For example, the tips 13a may have triangular, circular, or J-shaped cross-sections with correspondingly shaped chambers 14a.

In preferred embodiments, the insulating material 12 that creates the indented channel 14 is a deformable material, such as plastic or rubber, and the raised bead 13 is substantially rigid. Thus, the neck 14b of the indented channel 14 deforms around the tip 13a of the raised bead 13 as the tip 13a is fitted into the indented channel 14. When the tip 13a is fully inserted into the indented channel 14 such that the tip 13a fits within the chamber 14a, the neck 14b returns to its non-deformed state, thus securing the tip 13a within the chamber 14a.

In alternative embodiments, the tip 13a of the raised bead 13 is constructed of a deformable material, such as plastic or rubber, and the insulating material 12 that creates the indented channel 14 is substantially rigid. Thus, the tip 13a deforms as it passes through the neck 14b of the indented channel 14. When the tip 13a is fully inserted into the indented channel 14 such that the tip 13a fits within the chamber 14a, the tip 13a returns to its non-deformed state, thus securing the tip 13a with the chamber 14a.

In other alternative embodiments, both the tip 13a and the neck 14b are constructed of a deformable material. Both the tip 13a and the neck 14b deform as the tip 13a passes through the neck 14b. When the tip 13a is fully inserted into the indented channel 14 such that the tip 13a fits within the chamber 14a, both the tip 13a and the neck 14b return to their non-deformed states, thus securing the tip 13a within the chamber 14a.

In still other embodiments, neither the tip 13a nor the neck 14b are constructed of a deformable material. For example, FIGS. 3–4 show a pair of cables 10 and 20 attached to each other using a raised bead 13 and an indented channel 14. The second cable 20 is attached to the first cable 10 via the raised bead 13 on the second cable 20, which is fitted to the indented channel 14 on the first cable 10. The continuous attachment of the raised bead 13 into the indented channel 14 along the lengths of the cables 10 and 20 is clearly visible in these views. More specifically, a rigid tip 13a is fitted into a chamber 14a past a rigid neck 14b by aligning one end of the elongated rigid tip 13a with one end of the elongated chamber 14a and sliding the rigid tip 13a into and along the length of the elongated chamber 14a, such that the cables 10 and 20 are fitted to each other with a continuous attachment for a distance along the length of the cables 10 and 20.

In preferred embodiments of the present invention, more cables may be attached to an existing bundle of cables. FIG. 5 shows a bundle of cables 30 created by attaching cables 32, 34, and 36 together. In the illustrated embodiment, a cable 10 is attached to the bundle of cables 30 by attaching a raised bead 13 on the cable 10 to an indented channel 14 on the bundle of cables 30, and attaching an indented channel 14 on the cable 10 to a raised bead 13 on the bundle of cables 30, in the manner shown by the dashed lines, to create a larger bundle of cables.

Figure 6:
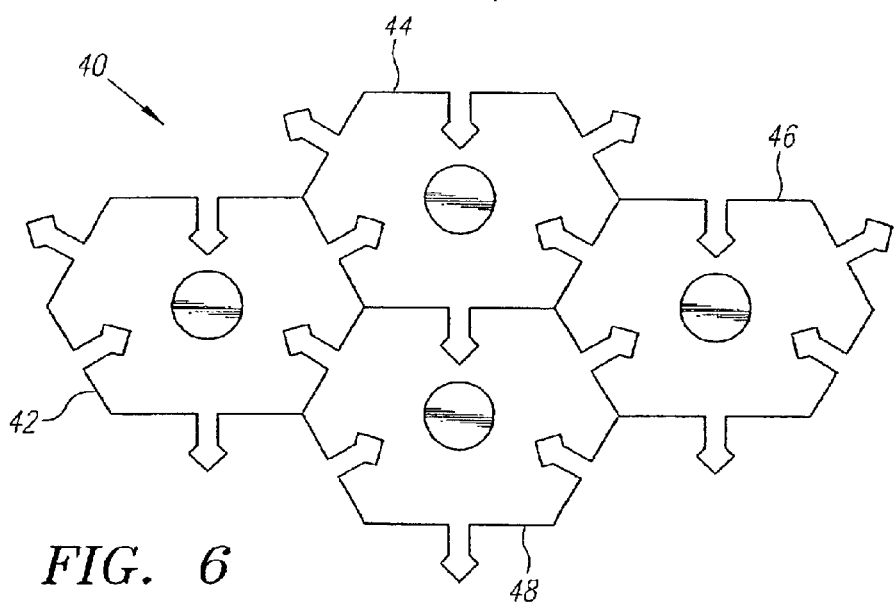
FIG. 6 is an end view of a bundle of cables with a hexagonal cross-section attached to each other with fasteners, using at least one raised bead and at least one indented channel, in accordance with a preferred embodiment of the present invention.

While the embodiments shown in FIGS. 1–5 contain cables with circular cross-sections, such a circular cross-section is not critical to the invention. FIG. 6 illustrates a bundle of cables 40 where the cables 42, 44, 46, and 48 have hexagonal cross-sections. In alternative embodiments, the cables 42, 44, 46, and 48 may have other cross-sections, such as squares, triangles, and octagons. Further, the cables may have asymmetrical cross-sections. For example, in the embodiment shown in FIG. 7, cables 52, 54, 56, and 58 have half-circle cross-sections and are attached around a central cable 50.

In another embodiment of the present invention (not shown), a plurality of cables 10, each cable 10 having one raised bead 13 and one indented channel 14 located opposite the raised bead 13, may be connected in a row. That is, a first cable 10 may be connected to second and third cables 10, the second and third cables 10 located on a substantially opposite side of the first cable 10. In other alternative embodiments (not shown), a plurality of cables 10, each cable 10 having one raised bead 13 and one indented channel 14 located perpendicular to the raised bead 13, may be connected in a square configuration, leaving no raised beads 13 and no indented channels 14 exposed.

Figure 7:
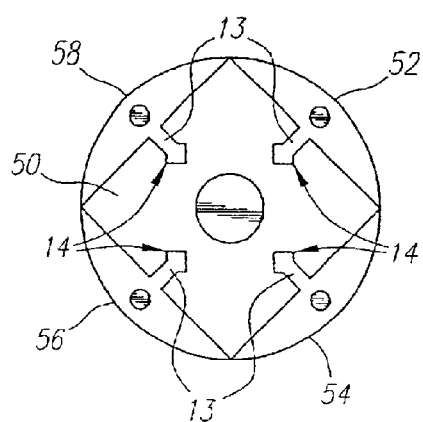
FIG. 7 is an end view of four asymmetric cables attached to a central cable using fasteners in accordance with a preferred embodiment of the present invention.

FIG. 7 illustrates an embodiment in which cables 52, 54, 56, and 58, each cable 52, 54, 56, or 58 having a single raised bead 13, are attached around a single cable 50 with a plurality of indented channels 14. The cables 52, 54, 56, and 58 with single raised beads 13 may be attached to the surface of the single cable 50 using the plurality of indented channels 14 in the single cable 50. In alternative embodiments, the allocation of raised beads 13 and indented channels 14 discussed above may be reversed such that the single cable 50 has a plurality of raised beads 13 and the cables 52, 54, 56, and 58 each have a single indented channel 14.

Figure 8:
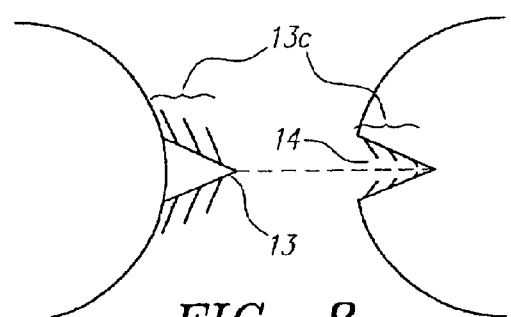
FIG. 8 is an exploded view of fasteners using a raised bead and an indented channel, both the raised bead and the indented channel containing fingers, in accordance with a preferred embodiment of the present invention.

FIG. 8 shows an embodiment in which the raised bead 13 has a plurality of fingers 13c extending outward from the sides of the raised bead 13. The fingers 13c extending outward from the sides of the raised bead 13 are preferably angled towards the insulating material 12, though other configurations may be chosen for the fingers 13c extending outward from the sides of the raised bead 13. The indented channel 14 likewise has a series of fingers 13c extending outward from the sides of the indented channel 14. The fingers 13c extending outward from the sides of the indented channel 14 are preferably angled away from the open end of the indented channel 14, though other configurations may be chosen for the fingers 13c extending outward from the sides of the indented channel 14. The fingers 13c on the raised bead 13 intermingle with the fingers 13c in the indented channel 14, causing the raised bead 13 to be held within the indented channel 14. The fingers 13c on the raised bead 13 and the fingers 13c on the indented channel 14 are preferably flexible, though rigid fingers 13c may be used.

Figure 9:
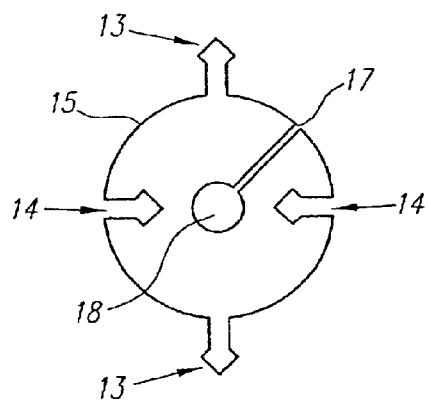
FIG. 9 is an end view of a preferred embodiment of a cable with a fastener wrap applied around the cable.
Figure 10:
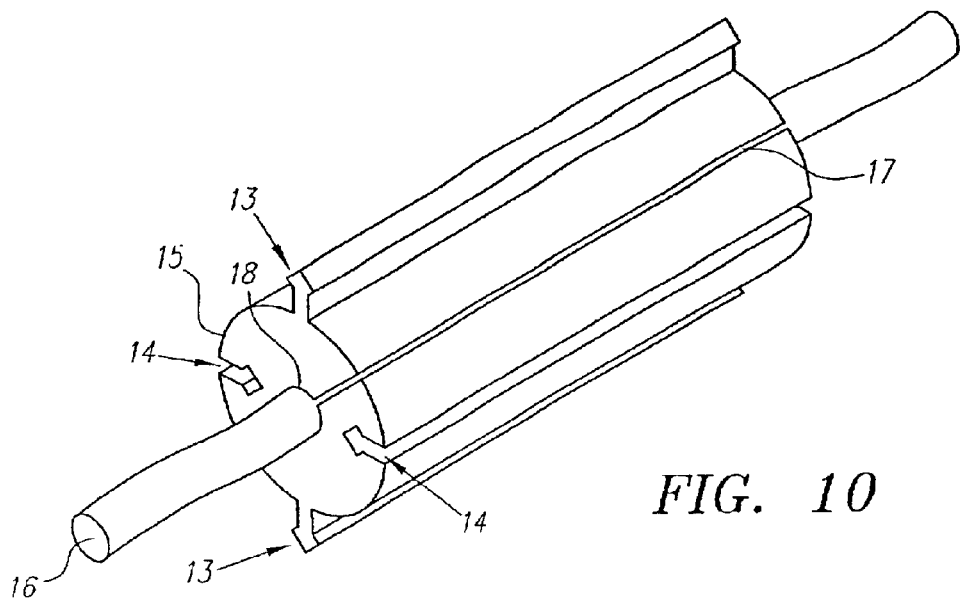
FIG. 10 is a perspective view of the cable with the fastener wrap applied around the cable illustrated in FIG. 9.

FIGS. 9–10 show a fastener wrap 15 for applying around an elongated object 16 in accordance with another preferred embodiment of the present invention. The wrap 15 is preferably constructed from a flexible material to be wrapped around the elongated object 16, such as plastic or rubber, though rigid materials may be used. The specific choice of the material for the wrap 15 depends upon the particular circumstances of a given implementation. The wrap 15 preferably has a central hollowed-out channel 18 running lengthwise along the interior of the wrap 15 such that the elongated object 16 can be contained within the central hollowed-out channel 18. The central hollowed-out channel 18 may, however, be located anywhere within the interior of the wrap 15.

In a preferred embodiment, a cut 17 is made in the wrap 15. The cut 17 penetrates from the outer surface of the wrap 15 all the way to the inner surface of the wrap 15 and into the central hollowed-out channel 18 defined in the wrap 15. The cut 17 extends lengthwise along the wrap 15, thereby allowing the wrap 15 to be separated for insertion of an elongated object 16. To place the elongated object 16 within the wrap 15, the wrap 15 is flexed such that an opening is formed by the cut 17, giving access to the central hollowed-out channel 18. The elongated object 16 is then inserted into the central hollowed-out channel 18 through the opening formed by the cut 17. The wrap 15 is then unflexed such that it is restored to its original state with the elongated object 16 contained within the central hollowed-out channel 18 in the wrap 15. Preferably, the opening created by the cut 17 should be narrow enough that the elongated object 16 can be securely contained within the wrap 15, though a wider opening in the cut 17 is also possible. The elongated object 16 may be removed from the wrap 15 by flexing the wrap 15 such that an opening is formed by the cut 17, and then extracting the elongated object 16 from the wrap 15 through the opening formed by the cut 17.

In alternative embodiments, the cut 17 may not be provided in the wrap 15. The elongated object 16 is placed within the central hollowed-out channel 18 by aligning the end of the elongated object 16 with the end of the wrap 15 such that the end of the elongated object 16 fits within the end of the central hollowed-out channel 18 in the wrap 15. The elongated object 16 is then fitted within the central hollowed-out channel 18 by sliding the elongated object 16 into the central hollowed-out channel 18. The elongated object may be removed from the wrap 15 by sliding the elongated object 16 out of the central hollowed-out channel 18 in the wrap 15.

Figure 11:
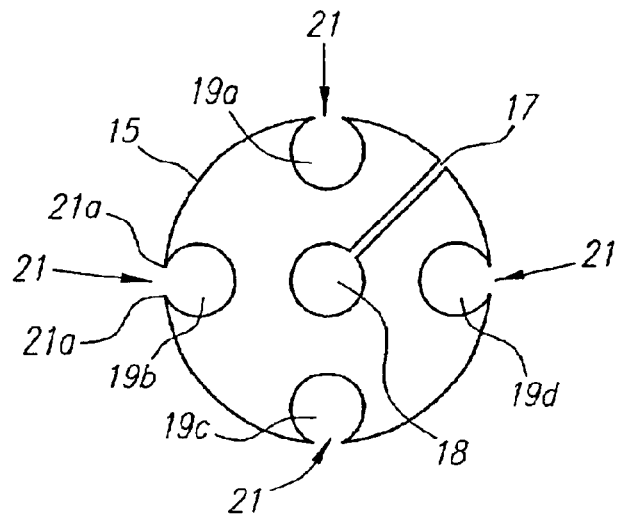
FIG. 11 is an end view of another embodiment of a cable with a fastener wrap applied around the cable.
Figure 12:
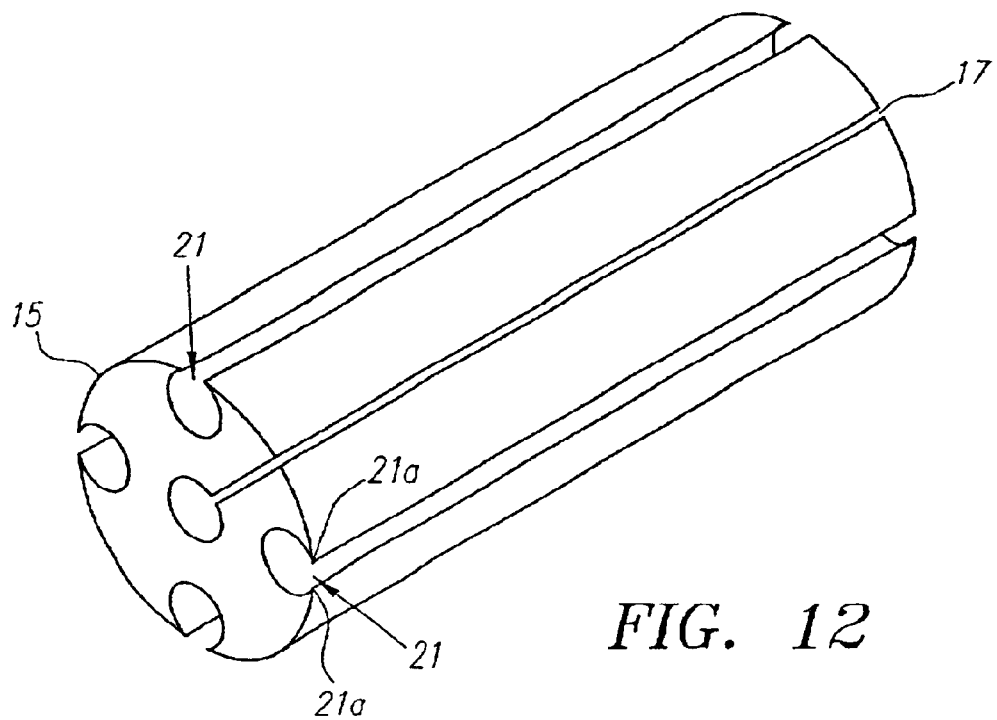
FIG. 12 is a perspective view of the cable with the fastener wrap applied around the cable illustrated in FIG. 11.

FIGS. 11–12 illustrate a fastener wrap 15 for applying around an elongated object in accordance with yet another preferred embodiment of the present invention. The wrap 15 includes a central hollowed-out channel 18 and a cut 17 as described above with respect to FIGS. 9–10. The wrap 15 also includes one or more peripheral hollowed-out channels 19a, 19b, 19c, and 19d such that each peripheral hollowed-out channel 19a, 19b, 19c, or 19d may contain an elongated object. In this embodiment, the peripheral hollowed-out channels 19a, 19b, 19c, and 19d are located around the outer surface of the wrap 15, but other locations are possible. Each peripheral hollowed-out channel 19a, 19b, 19c, or 19d has a lengthwise opening 21 in the surface of the wrap 15. Each lengthwise opening 21 has two flexible lips 21a, preferably running the length of the opening, which facilitate the insertion of an elongated object within each peripheral hollowed-out channel 19a, 19b, 19c, or 19d of the wrap 15.

An elongated object is inserted within a peripheral hollowed-out channel 19a, 19b, 19c, or 19d through a lengthwise opening 21 in the surface of the wrap 15 by aligning the elongated object with the lengthwise opening 21. Force is then applied to push the elongated object through the lengthwise opening 21, deforming the flexible lips 21a out of the way, and into the peripheral hollowed-out channel 19a, 19b, 19c, or 19d. Once the elongated object has passed beyond the lips 21a, the lips 21a reform their original orientation. The lips 21a then hold the elongated object within the peripheral hollowed-out channel 19a, 19b, 19c, or 19d.

Figure 13:
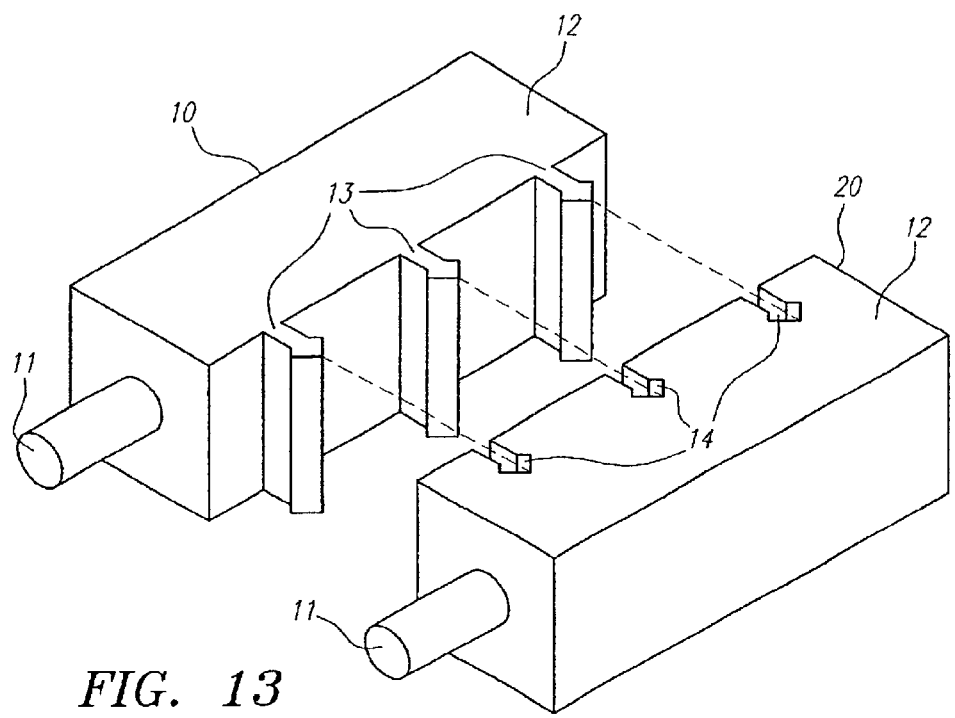
FIG. 13 is a perspective view of an embodiment of a cable with a fastener mounted perpendicular to the length and the width of the cable.

FIG. 13 shows another embodiment of the present invention. In this embodiment, a cable 10 includes an electrically conducting element 11 surrounded by an insulating material 12. The cable 10 has a plurality of raised beads 13 molded along the lengthwise direction of one face of the insulating material 12. Each raised bead 13 is substantially perpendicular to both the length and the width of the first cable 10. A second cable 20 has a series of indented channels 14 molded along the lengthwise direction of one face of the insulating material 12. Each indented channel 14 is substantially perpendicular to both the length and the width of the second cable 20. The cables 10 and 20 are attached together by aligning the plurality of raised beads 13 with the plurality of indented channels 14 and applying force to fit the raised beads 13 into the indented channels 14.

Figure 14:
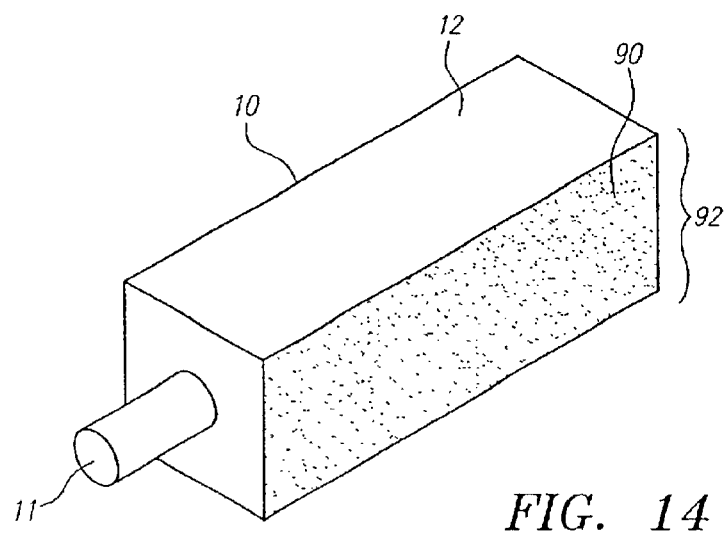
FIG. 14 is a perspective view of an embodiment of a cable with a fastener that includes an adhesive substance.

FIG. 14 illustrates still another embodiment of the present invention. In this embodiment, a cable 10 includes an electrically conducting element 11 surrounded by an insulating material 12. The fastener on the cable 10 includes an adhesive substance 90 located lengthwise along a face 92 of the insulating material 12. The composition of the adhesive substance 90 is a design choice that is not critical to the invention. Possible adhesive substances 90 include, but are not be limited to, VELCRO® brand connectors, double-sided sticky adhesive tapes, or various glues or cements.

Figure 15:
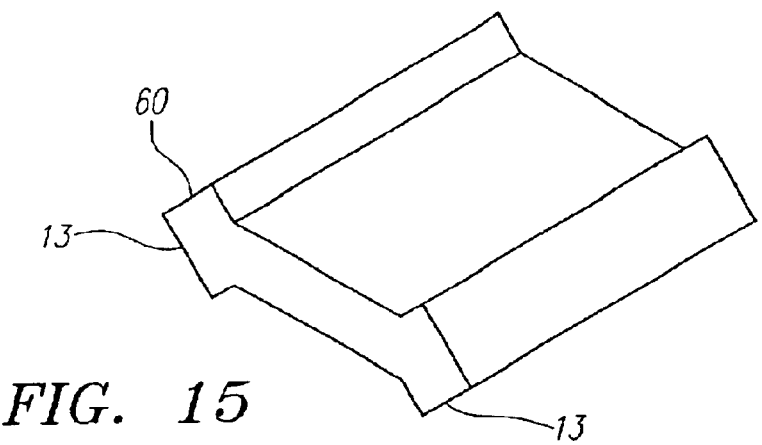
FIG. 15 is a perspective view of an adapter that converts an indented channel to a raised bead.
Figure 16:
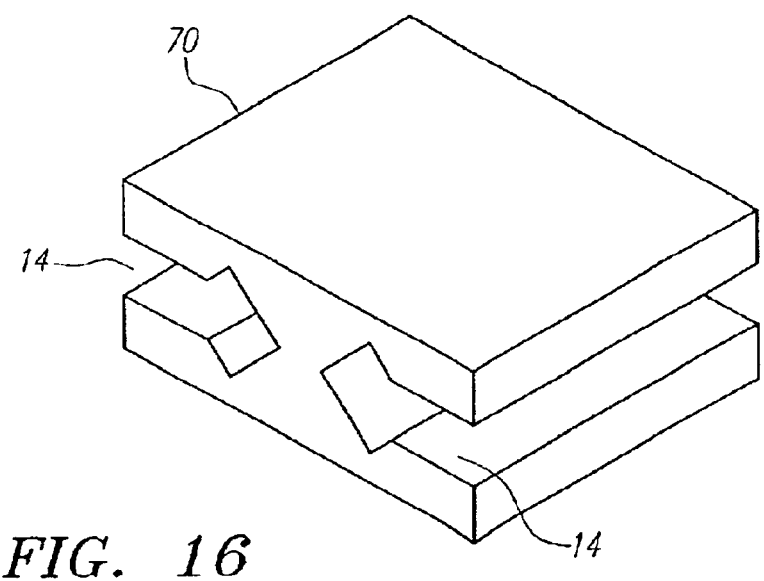
FIG. 16 is a perspective view of an adapter that converts a raised bead to an indented channel.
Figure 17:
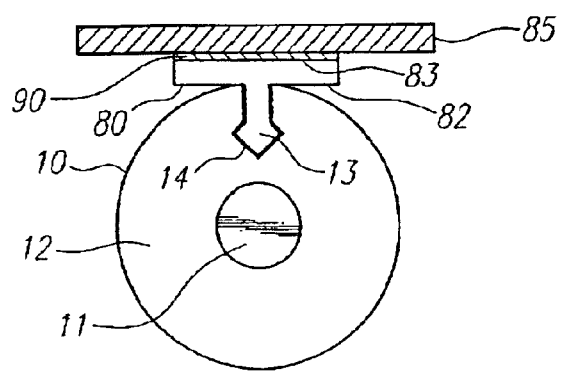
FIG. 17 is an end view of a hanger that converts an indented channel to an adhesive substance, the hanger being attached to an elongated object on one side and a ceiling panel on the other side.

FIGS. 15–17 show converters which are attachable to a fastener 13 or 14 on an elongated object in accordance with other preferred embodiments of the present invention. In the illustrated embodiments, the converter takes the form of a first adapter 60 shown in FIG. 15, a second adapter 70 shown in FIG. 16, or a hanger 80 shown in FIG. 17.

In the embodiment illustrated in FIG. 15, the converter is a first adapter 60 having a pair of opposing raised beads 13, though more raised beads 13 may be used. The first adapter 60 is used in concert with, for example, a cable 10 or a wrap 15 containing at least one indented channel 14. The first adapter 60 is attached to the cable 10 or wrap 15 in the manner discussed above for attachments using raised beads 13 and indented channels 14. Once the first adapter 60 is attached to the cable 10 or wrap 15, it causes the indented channel 14 to function as a raised bead 13 when attaching the combined first adapter 60 plus cable 10 or wrap 15 assembly to other cables 10 or wraps 15, or to other objects.

In the embodiment shown in FIG. 16, the converter is a second adapter 70 having a pair of opposing indented channels 14 instead of raised beads 13, though more indented channels 14 may be used. Similar to the first adapter 60 described above, the second adapter 70 is used in concert with, for example, a cable 10 or a wrap 15 containing at least one raised bead 13. The second adapter 70 is attached to the cable 10 or wrap 15 in the manner discussed above for attachments using raised beads 13 and indented channels 14. Once the second adapter 70 is attached to the cable 10 or wrap 15, it causes the raised bead 13 to function as an indented channel 14 when attaching the combined second adapter 70 plus cable 10 or wrap 15 assembly to other cables 10 or wraps 15, or to other objects.

In the embodiment illustrated in FIG. 17, the converter is a hanger 80 which has a raised bead 13 extending lengthwise along a first face 82 of the hanger 80, though other fasteners, such as an indented channel 14 may also be used. The hanger 80 has an adhesive substance 90 running lengthwise along a second face 83 of the hanger 80, though other fasteners, such as a clamp or magnet, may be used. In one embodiment, a cable 10 (including an electrically conducting element 11 surrounded by an insulating material 12) is attached to the hanger 80 using a raised bead 13 on the hanger 80 fitted to an indented channel 14 on the cable 10. The hanger 80 is then attached to a ceiling panel or a wall 85, preferably with the adhesive substance 90. The particular fastener used to attach the hanger 80 to the ceiling panel or wall 85, however, is a design choice that is not critical to the invention. The hanger 80 may be attached to a wide variety of objects, including but not limited to floors, walls, ceilings, desktops, or furniture legs. The particular object or objects to which the hanger 80 is attached is a design choice that is not critical to the invention.

Several preferred embodiments of a system of organizing elongated objects, such as wires, cables (such as computer, electrical, power, fiber optics, telephone, network, and/or other cables), pipes, hoses, ducts, tubing and other similar items, into bundles, and many of the system's attendant advantages, have thus been disclosed. It will be apparent, however, that various changes may be made in the system's form and components without departing from the spirit and scope of the invention, the embodiments hereinbefore described being merely preferred or exemplary embodiments thereof. Therefore, the invention is not to be restricted or limited except in accordance with the following claims and their legal equivalents.

What is claimed is:

1. A system for organizing one or more elongated objects, each elongated object having a length and a width, the length exceeding the width, comprising:

a first fastener adapted to extend for a distance along the length of at least a first one of the elongated objects and capable of coupling the first one of the elongated objects to a second one of the elongated objects or to another object;

a second fastener adapted to extend for a distance along the length of at least the first one of the elongated objects and capable of coupling the first one of the elongated objects to a third one of the elongated objects or to another object;

wherein the first fastener and the second fastener have substantially complementary shapes; and wherein the first fastener comprises a raised bead and the second fastener comprises an indented channel, and each of the first and second fasteners has a plurality of fingers formed thereon.

2. The system of claim 1, wherein the first fastener is adapted to extend along substantially all of the length of at least the first one of the elongated objects.

3. The system of claim 1, wherein the first fastener is reusable.

4. A system for organizing one or more elongated objects, each elongated object having a length and a width, the length exceeding the width, comprising:

a first fastener adapted to extend for a distance along the length of at least a first one of the elongated objects and capable of coupling the first one of the elongated objects to a second one of the elongated objects or to another object;

wherein the first fastener comprises a wrap adapted to be applied around the first one of the elongated objects, the wrap comprising an outer surface facing away from the first one of the elongated objects and an inner surface facing towards the first one of the elongated objects.

5. The system of claim 4, wherein a channel is defined in the inner surface of the wrap for receiving the first one of the elongated objects.

6. The system of claim 5, wherein the first one of the elongated objects is removable from the wrap.

7. The system of claim 5, wherein a cut extending lengthwise along the wrap is defined in the wrap, the cut extending from the outer surface of the wrap to the inner surface of the wrap.

8. The system of claim 5, wherein at least one channel is defined in the outer surface of the wrap for receiving the second one of the elongated objects.

9. A system for organizing one or more elongated objects, each elongated object having a length and a width, the length exceeding the width, comprising:
- a first fastener adapted to extend for a distance along the length of at least a first one of the elongated objects and capable of coupling the first one of the elongated objects to a second one of the elongated objects or to another object; and
- a converter adapted for attachment to the first fastener;
- wherein the converter comprises a plurality of female components, and wherein at least one female component is adapted for attachment to the first fastener.

10. The system of claim 9, wherein the converter comprises a plurality of indented channels, and wherein at least one indented channel is adapted for attachment to the first fastener.

11. A system for organizing one or more elongated objects, comprising:
- a first elongated object having a length, the first elongated object comprising at least one conductor and a sheath surrounding the at least one conductor;
- a first fastener component formed on the sheath and extending for a distance along the length of the first elongated object; and
- a second fastener component formed on the sheath and extending for a distance along the length of the first elongated object.

12. The system of claim 11, wherein the first fastener component comprises at least one male component integrated with the first elongated object.

13. The system of claim 12, wherein the first fastener component comprises at least one raised bead.

14. The system of claim 12, wherein the second fastener component comprises at least one female component integrated with the first elongated object.

15. The system of claim 14, wherein the second fastener component comprises at least one indented channel defined in the first elongated object.

16. The system of claim 11, further comprising a third fastener component formed on the sheath of the first elongated object.

17. The system of claim 11, further comprising a converter adapted for attachment to the first fastener component.

18. The system of claim 17, wherein the converter comprises a plurality of male components, and wherein at least one male component is adapted for attachment to the second fastener component.

19. The system of claim 17, wherein the converter comprises a plurality of raised beads, and wherein at least one raised bead is adapted for attachment to the second fastener component.

20. The system of claim 17, wherein the converter comprises a hanger having a third fastener component adapted for attachment to the first fastener component.

21. The system of claim 11 additionally comprising a third fastener component integrated with the first elongated object, the first fastener component and the third fastener component having substantially similar shapes.

22. The system of claim 21, additionally comprising a fourth fastener component integrated with the first elongated object, the second fastener component and the fourth fastener component having substantially similar shapes.

23. The system of claim 22 wherein the first and third fastener components are at substantially diametrically opposite locations on the first one elongated object and the second and fourth fastener components are at substantially diametrically opposite locations on the first elongated object.

24. The system of claim 11 wherein the first elongated object has a transverse cross section with a polygonal perimeter shape, each of the fastener components being located on a substantially planar face of the first elongated object.

25. The system of claim 11 wherein the first fastener component and the second fastener component are integrated with the first elongated object at substantially opposite locations on the first elongated object.

26. The system of claim 11 wherein the first fastener component and the second fastener component have substantially complementary shapes.

27. The system of claim 11 wherein the first fastener component is a male component and the second fastener component is a female component.

28. The system of claim 11 wherein the first fastener component and the second fastener component are at substantially diametrically opposite locations on the first elongated object.

29. The system of claim 11 additionally comprising a third fastener component formed on the sheath at a diametrically opposite location from the first fastener component on the first elongated object, a fourth fastener component formed on the sheath at a diametrically opposite location from the second fastener component on the first elongated object, the first and third fastener components each having a substantially complementary shape to a shape of each of the second and fourth fastener components, each of the first and third fastener components comprising a raised bead and each of the second and fourth fastener components comprising an indented channel; and
- wherein the at least one conductor is substantially centrally located in the first elongated abject and the sheath comprises an insulating material.

* * * * *